(12) United States Patent
Sung

(10) Patent No.: US 10,882,576 B2
(45) Date of Patent: *Jan. 5, 2021

(54) BIKE SADDLE INCORPORATING WITH BIO-GEL STRUCTURE

(71) Applicant: DDK GROUP CO., LTD. TAIWAN BRANCH, Taichung (TW)

(72) Inventor: Ying-Chiao Sung, Taichung (TW)

(73) Assignee: DDK Group Co., Ltd., Taiwan Branch, Taichung (TW)

(*) Notice: Subject to any disclaimer, the term of this patent is extended or adjusted under 35 U.S.C. 154(b) by 0 days.

This patent is subject to a terminal disclaimer.

(21) Appl. No.: 16/449,550

(22) Filed: Jun. 24, 2019

(65) Prior Publication Data

US 2019/0308683 A1 Oct. 10, 2019

Related U.S. Application Data

(63) Continuation-in-part of application No. 15/973,701, filed on May 8, 2018, now Pat. No. 10,442,484.

(30) Foreign Application Priority Data

Mar. 21, 2018 (TW) .............................. 107203625 U

(51) Int. Cl.
*B62J 1/18* (2006.01)
*B62J 1/22* (2006.01)
*B62J 1/26* (2006.01)

(52) U.S. Cl.
CPC ....................................... *B62J 1/26* (2013.01)

(58) Field of Classification Search
CPC ..................................... B62J 1/007; B62J 1/26
USPC .................................................. 297/214, 202
See application file for complete search history.

(56) References Cited

U.S. PATENT DOCUMENTS

| | | | | |
|---|---|---|---|---|
| 4,471,538 A * | 9/1984 | Pomeranz | ............ | A43B 13/189 297/214 X |
| 4,815,361 A * | 3/1989 | Chiarella | ............ | B62J 1/18 297/214 |
| 4,999,068 A * | 3/1991 | Chiarella | ............ | B62J 1/18 297/214 X |
| 5,108,076 A * | 4/1992 | Chiarella | ............ | B62J 1/18 297/214 |
| 5,121,962 A * | 6/1992 | Weber | ............ | A41D 19/01523 297/214 X |
| 5,203,607 A * | 4/1993 | Landi | ............ | B62J 1/26 297/214 X |
| 5,441,676 A * | 8/1995 | Bigolin | ............ | B29D 99/0092 264/496 |
| 5,720,518 A * | 2/1998 | Harrison | ............ | B62J 1/22 297/202 |

(Continued)

*Primary Examiner* — Rodney B White

(74) *Attorney, Agent, or Firm* — Rosenberg, Klein & Lee

(57) ABSTRACT

A cushion incorporating a bio-gel structure includes a foam material layer and a surface layer set on and covering a surface of the foam material layer. A plurality of spaced through holes is formed in the foam material layer. A bio-gel layer is formed on an undersurface of the foam material layer. A plurality of bio-gel blocks are respectively filled in the through holes of the foam material layer. Each of the bio-gel blocks has a top end in contact with an underside of the surface layer and a bottom end integrally connected with the bio-gel layer. The bio-gel layer provides a rider with comfortable riding experience and also achieves an antibacterial effect.

13 Claims, 6 Drawing Sheets

(56) References Cited

U.S. PATENT DOCUMENTS

| | | | | |
|---|---|---|---|---|
| 5,738,406 | A * | 4/1998 | Deus | B62J 1/26 297/200 |
| 5,791,730 | A * | 8/1998 | Hoffacker | B62J 1/00 297/214 X |
| 5,904,396 | A * | 5/1999 | Yates | B62J 1/002 297/214 X |
| 5,938,277 | A * | 8/1999 | Rioux | B62J 1/26 297/214 X |
| 6,007,149 | A * | 12/1999 | Yates | B62J 1/00 297/214 X |
| 6,030,035 | A * | 2/2000 | Yates | B62J 1/18 297/214 X |
| 6,039,395 | A * | 3/2000 | Culbertson | B62J 1/002 297/195.1 |
| 6,106,059 | A * | 8/2000 | Minkow | B62J 1/002 297/214 X |
| 6,131,994 | A * | 10/2000 | Yates | B62J 1/002 297/214 X |
| 6,231,122 | B1 * | 5/2001 | Goldstein | B62J 1/00 297/214 X |
| 6,257,662 | B1 * | 7/2001 | Yates | B62J 1/00 297/214 X |
| 6,260,919 | B1 * | 7/2001 | Yates | B62J 1/02 297/195.1 |
| 6,409,865 | B1 * | 6/2002 | Yates | B62J 1/00 156/214 |
| 6,450,572 | B1 * | 9/2002 | Kuipers | B62J 1/00 297/195.1 |
| 6,547,327 | B1 * | 4/2003 | Yates | B62J 1/20 297/214 X |
| 7,055,900 | B2 * | 6/2006 | Losio | B62J 1/002 297/214 X |
| 7,367,619 | B2 * | 5/2008 | Fregonese | B62J 1/00 297/195.1 |
| 7,572,498 | B2 * | 8/2009 | Bigolin | B62J 1/26 297/214 X |
| 8,128,164 | B2 * | 3/2012 | Segato | B62J 1/007 297/202 X |
| 9,132,874 | B2 * | 9/2015 | Sam | B62J 1/22 |
| 10,442,484 | B1 * | 10/2019 | Sung | B62J 1/26 |
| 2005/0046245 | A1 * | 3/2005 | Yu | B62J 1/00 297/214 |
| 2005/0104423 | A1 * | 5/2005 | Yu | B62J 1/00 297/214 |
| 2005/0236875 | A1 * | 10/2005 | Milton | B62J 1/002 297/202 |
| 2006/0049675 | A1 * | 3/2006 | Fregonese | B62J 1/00 297/214 X |
| 2006/0119148 | A1 * | 6/2006 | Bigolin | B62J 1/18 297/214 |
| 2008/0197680 | A1 * | 8/2008 | Chuang | B62J 1/005 297/214 |
| 2009/0096259 | A1 * | 4/2009 | Segato | B62J 1/18 297/214 |
| 2011/0233973 | A1 * | 9/2011 | Wyner | A41D 13/082 297/214 |
| 2011/0298253 | A1 * | 12/2011 | Toll | B62J 1/002 297/214 |
| 2012/0292958 | A1 * | 11/2012 | Sprouse, II | B62J 1/26 297/214 X |
| 2013/0099531 | A1 * | 4/2013 | Segato | B62J 1/00 297/214 |
| 2013/0214568 | A1 * | 8/2013 | Mueller | B62J 1/00 297/195.1 |
| 2014/0159445 | A1 * | 6/2014 | Sam | B62J 1/00 297/214 |
| 2015/0097401 | A1 * | 4/2015 | Toll | B62J 1/08 297/214 |
| 2015/0239515 | A1 * | 8/2015 | Toll | B62J 1/007 297/214 |
| 2017/0036724 | A1 * | 2/2017 | Yu | B29C 43/50 |
| 2017/0144571 | A1 * | 5/2017 | Chiba | B60N 2/914 |
| 2018/0057089 | A1 * | 3/2018 | Toll | B62J 1/18 |
| 2018/0186420 | A1 * | 7/2018 | Yu | A61B 1/00 |
| 2018/0200926 | A1 * | 7/2018 | Yu | B62J 1/26 |
| 2019/0092409 | A1 * | 3/2019 | Page | B62J 1/002 |
| 2019/0185089 | A1 * | 6/2019 | Pruitt | B62J 1/005 |

* cited by examiner

BIKE SADDLE INCORPORATING WITH BIO-GEL STRUCTURE

CROSS-REFERENCES TO RELATED APPLICATIONS

This application is a continuation-in-part of Ser. No. 15/973,701 filed on May 8, 2018, entitled "BIKE SADDLE INCORPORATING WITH BIO-GEL STRUCTURE", now U.S. Pat. No. 10,442,484 B1.

BACKGROUND OF THE INVENTION

1. Field of the Invention

The present invention relates to a cushion structure, and in particular to a bike saddle incorporating a bio-gel structure.

2. The Related Arts

In the known structure designs of saddle or seat cushion of bicycle or electrical vehicle, to protect a user from undertaking much vibration and vibration in riding a bicycle or an electrical vehicle and to improve riding comfortableness, it is common to provide a foamed material layer, a sponge layer, a memory foam layer, or other flexible or soft material that is mounted to the underside of the saddle or seat cushion in order to absorb a part of the vibration and shock. In a different product design, a gel layer in the form of an entire span of solid material is provided in the saddle or seat cushion to serve as a material for absorbing vibration and shock.

However, issues of damping and mold growth, bacterium breeding, and odor smell often occur with the cushion material after the saddle or seat cushion have been used for a while. Heretofore, no solution has been proposed to effectively handle such issues. Further, using the gel layer in the form of an entire span of solid material may undesirably increase the overall weight of the saddle or seat cushion. In addition, such an entire span of gel material is generally adverse to ventilation and cooling on the side in direct contact with a human body.

SUMMARY OF THE INVENTION

In view of the above, the primary objective of the present invention is to provide a bike saddle incorporating with a bio-gel structure, which is desired to provide improved comfortableness of use of cushion and also to achieve an antibacterial effect.

To achieve the above objective, the present invention comprises, arranged in a saddle or put in a shoe as an insole for the shoe, a foam material layer and a surface layer set on and covering a surface of the foam material layer. A plurality of spaced through holes are formed in the foam material layer. A bio-gel layer is formed on an undersurface of the foam material layer. A plurality of bio-gel blocks are respectively filled in the plurality of through holes of the foam material layer. Each of the bio-gel blocks has a top end in contact with an underside of the surface layer and a bottom end integrally connected with the bio-gel layer.

Compared to the traditional one-piece design of gel layer, the present invention provides a structural design that helps reduce the product weight and offers an excellent effect of ventilation when a rider is sitting on the saddle.

The structure of the present invention provides important features of the bio-gel layer in respect of flexibility, air breathing, and vibration absorption. In other words, the present invention provides a saddle that features capability of suppressing bacteria breeding, providing an effect of excellent regional blood circulation of the rider, and featuring proper flexibility and softness, cooling, and ventilation.

In the present invention, the bio-gel blocks could be distributed in for example an entire area of the saddle or in regional portions corresponding to ischium pressure supporting zones, leg contact zones, or a central line connection zone, so that the present invention provides an effect of stress release in regional area for a rider riding a vehicle.

BRIEF DESCRIPTION OF THE DRAWINGS

The present invention will be apparent to those skilled in the art by reading the following description of preferred embodiments of the present invention, with reference to the attached drawings, in which.

DETAILED DESCRIPTION OF THE PREFERRED EMBODIMENTS

Figure 1:
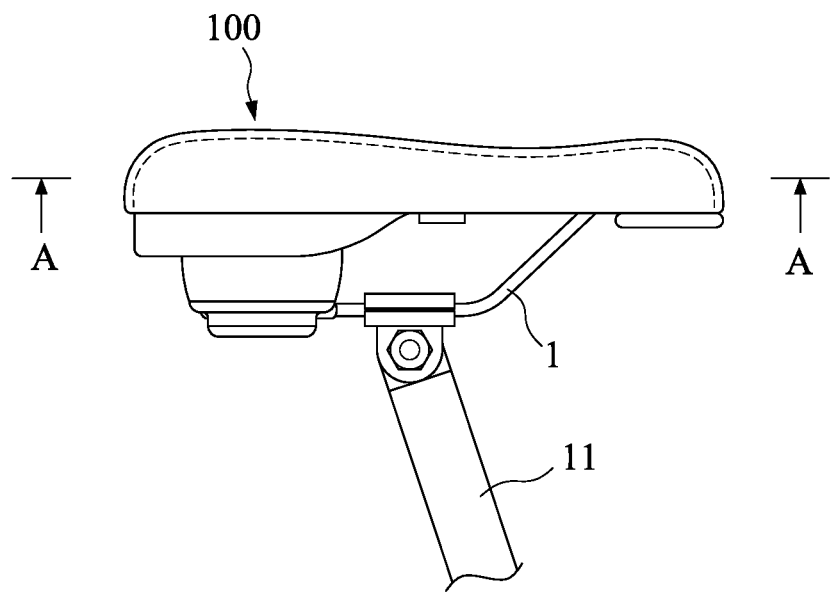
FIG. 1 is a side elevational view showing a bike saddle incorporating with a bio-gel structure according to a first embodiment of the present invention.
Figure 2:
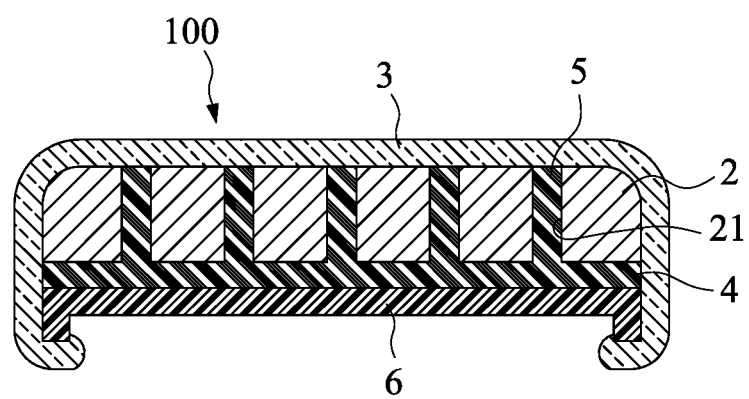
FIG. 2 is a cross-sectional view taken along line A-A of FIG. 1.

Referring collectively to FIGS. 1-2, a side elevational view is provided to illustrate a bike saddle incorporating a bio-gel structure according to the present invention, wherein FIG. 2 is a cross-sectional view taken along line A-A of FIG. 1. As shown in the drawings, a saddle 100 has a bottom to which a support frame 1 is mounted. The support frame 1 is coupled to a vertical post 11. The saddle 100 can be a saddle or seat cushion for use in a bicycle, an electrical vehicle, an automobile, or other applications.

As shown in FIG. 2, the saddle 100 generally comprises a foam material layer 2 and a surface layer 3 set on and covering a surface of the foam material layer 2. The foam material layer 2 is made of a material selected among polyurethane (PU), ethylene vinyl acetate (EVA), polypropylene (PP), thermoplastic rubber (TPR), and polyvinyl chloride (PVC).

The foam material layer 2 can also be made of thermoplastic polyurethane (TPU). The material is formed of a plurality of foam units that are arranged such that multiple ones of the foam unites are adhesively bonded together with an adhesive material or adjacent ones of the foam units are connected together through fusion of surfaces of the foam units with heat. Each of the foam units is formed through a foaming process such that multiple pores are formed, through foaming, in the interior thereof so that a material layer that features lightweight and high elasticity is formed.

In the structural arrangement of the present invention, the foam material layer 2 is formed therein with a plurality of through holes 21 that are spaced from each other. Each of the through holes 21 is structured as a columnar or cylindrical hole, meaning a bottom opening and a top opening of each of the through holes 21 have the same diameter.

A bio-gel layer 4 is formed on an undersurface of the foam material layer 2. A plurality of bio-gel blocks 5 are respectively filled in the plurality of through holes 21 formed in the foam material layer 2. Each of the bio-gel blocks 5 has a top end in contact with and supporting an underside of the surface layer 3 and a bottom end integrally connected with the bio-gel layer 5.

The bio-gel layer 4 and the bio-gel blocks 5 are each an elastic body formed of a gel material. For example, the gel material can be a polyurethane-based gel, a silicone-based gel, a PVC-based gel, or an acrylic-based gel.

In this invention, the gel material that makes the bio-gel layer 4 and the bio-gel blocks 5 is added with or coated and covered with an antibacterial material. The antibacterial material may include antibacterial microorganisms, so that a volatile compound generated by the antibacterial microorganisms may provide effects, through air, to suppress growth of bacteria and decompose odor smell.

Further, the antibacterial material may for example include nanoparticles of silver. The silver nanoparticles are added in the bio-gel layer 4 and the bio-gel blocks 5 or are coated as a surface layer of the bio-gel blocks 5. The silver nanoparticles also provide an antibacterial effect.

Further, the antibacterial material may for example include a far infrared ceramic material or a far infrared nanomaterial so as to provide the bio-gel blocks 5 with an effect of emission of far infrared radiation and releasing negative ions. When bacteria live in the saddle, the infrared radiation may weaken activity of the bacteria and the negative ions, when absorbed by the bacteria, may cause death of the bacteria. When the body of a rider is put in contact with the far infrared emission bio-gel blocks, an effect of prompting regional blood circulation may be acquired.

The above-described structure of the saddle can be arranged in the form as an envelope or cover of the saddle in order to fit over the surface of an existing bike saddle. Alternatively, a bottom material 6 may be directly mounted to an undersurface of the foam material layer 2 for mounting to the support frame 1 shown in FIG. 1 for further coupling with the vertical post 11 to serve as a saddle of a bicycle.

Figure 3:
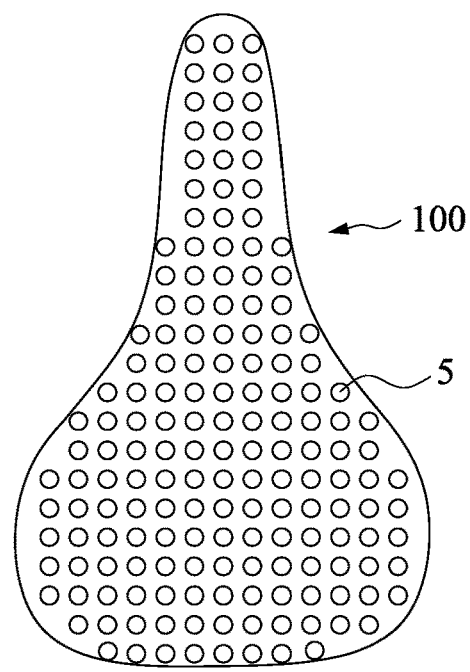
FIG. 3 is a schematic view illustrating a first example of distribution of bio-gel blocks in a saddle according to the present invention.

FIG. 3 is a schematic view illustrating a first example of distribution of the bio-gel blocks in the saddle according to the present invention. As shown in the drawing, the entirety of the surface of the saddle 100 is provided with the through holes 21 in a manner of uniform distribution over the entire surface. In other words, the bio-gel blocks 5 are arranged to distribute in the entire area of the foam material layer 2.

Figure 4:
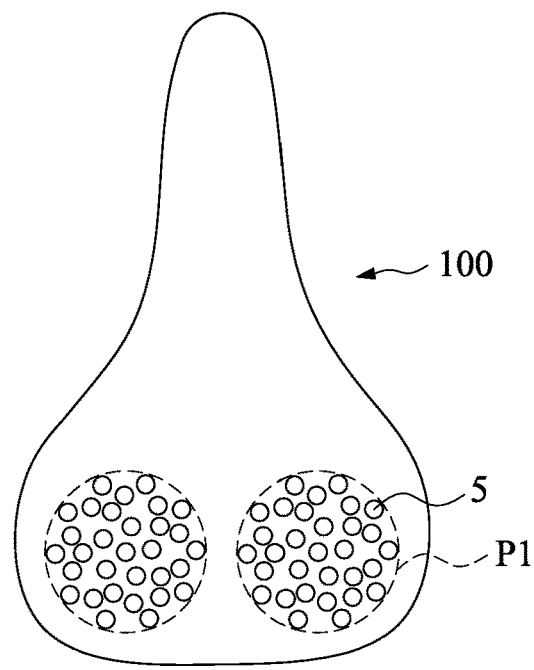
FIG. 4 is a schematic view illustrating a second example of distribution of bio-gel blocks in a saddle according to the present invention.

FIG. 4 is a schematic view illustrating a second example of distribution of the bio-gel blocks in the saddle according to the present invention. As shown in the drawing, the saddle 100 has two ischium pressure supporting zones P1 that are areas respectively corresponding to the ischium bones of a rider sitting on the saddle. The plurality of bio-gel blocks 5 are arranged in the foam material layer 2 at portions corresponding to the ischium pressure supporting zones P1.

Figure 5:
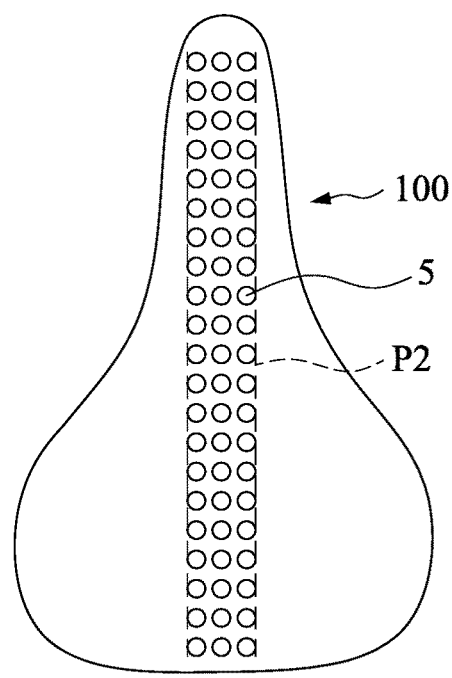
FIG. 5 is a schematic view illustrating a third example of distribution of bio-gel blocks in a saddle according to the present invention.

FIG. 5 is a schematic view illustrating a third example of distribution of the bio-gel blocks in the saddle according to the present invention. As shown in the drawing, the saddle 100 has a central line connection zone P2 that is defined as a central area extending from a front end thereof to a rear. The plurality of bio-gel blocks 5 are arranged in the foam material layer 2 at a portion corresponding to the central line connection zone P2.

Figure 6:
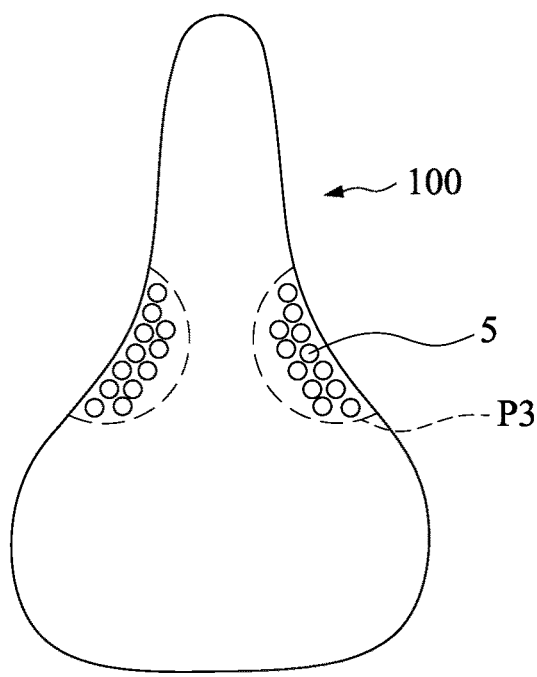
FIG. 6 is a schematic view illustrating a fourth example of distribution of bio-gel blocks in a saddle according to the present invention.

FIG. 6 is a schematic view illustrating a fourth example of distribution of the bio-gel blocks in the saddle according to the present invention. As shown in the drawing, the saddle 100 has regional areas that correspond to inner sides of thighs of a rider and are defined as leg contact zones P3. The plurality of bio-gel blocks 5 are arranged in the foam material layer 2 at portions corresponding to the leg contact zones P3.

Figure 7:
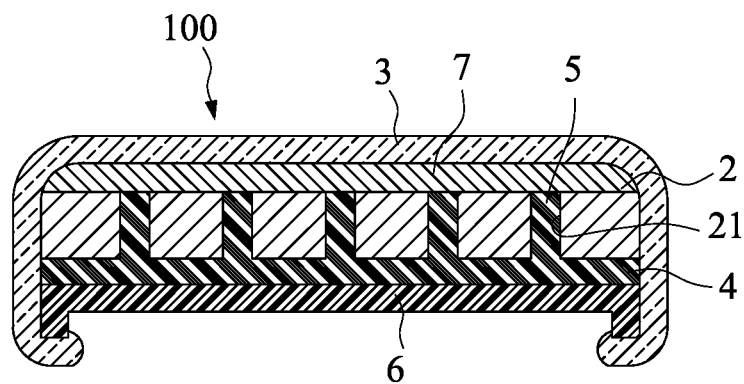
FIG. 7 is a cross-sectional view showing a bike saddle incorporating with a bio-gel structure according to a second embodiment of the present invention.

FIG. 7 is a cross-sectional view showing a bike saddle incorporating with a bio-gel structure according to a second embodiment of the present invention. The instant embodiment is structured similar to the first embodiment and similar components and parts are designated with the same reference numerals for consistency. In the instant embodiment, a vibration absorbing material layer 7 is arranged between the foam material layer 2 and the surface layer 3. For example, the vibration absorbing material layer 7 can be one of a memory foam layer or a foam or sponge layer. Memory foam is a material made of polyurethane polymer, featuring both viscosity and elasticity, so that when an external force causes the memory foam to undergo deformation, the memory foam may gradually restore in order to absorb the kinetic energy of impact.

Figure 8:
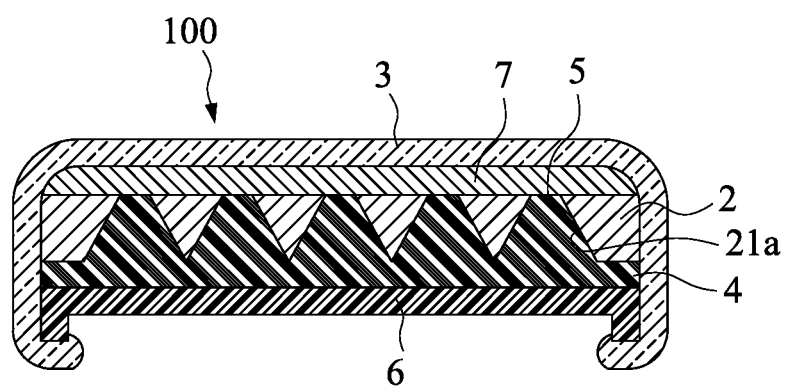
FIG. 8 is a cross-sectional view showing a bike saddle incorporating with a bio-gel structure according to a third embodiment of the present invention.

FIG. 8 is a cross-sectional view showing a bike saddle incorporating with a bio-gel structure according to a third embodiment of the present invention. In the instant embodiment, the foam material layer 2 is formed, in an interior thereof, with a plurality of truncated-conic through holes 21a. Namely, the truncated-conic through holes 21a each have a top opening having a reduced diameter and a bottom opening having an enlarged opening. Alternatively, the truncated-conic holes 21a may be reversed truncated-conic through holes each having a bottom opening having a reduced diameter and a top opening having an enlarged diameter.

Figure 9:
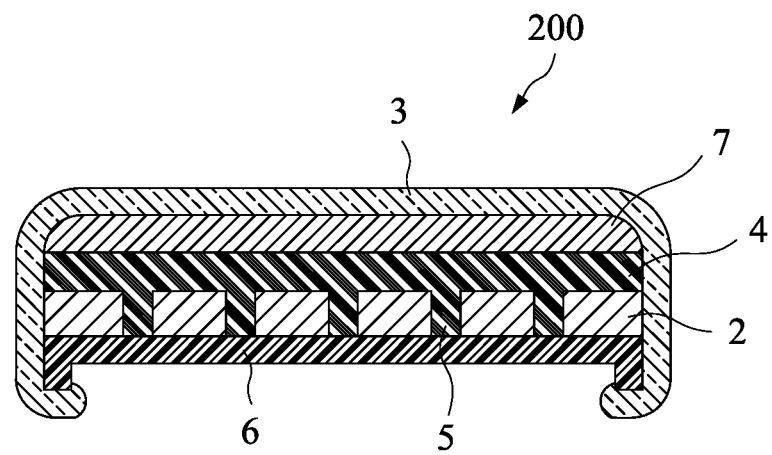
FIG. 9 is a cross-sectional view showing a cushion incorporating with a bio-gel structure according to a fourth embodiment of the present invention.

FIG. 9 is a cross-sectional view showing a bike saddle 200 incorporating with a bio-gel structure according to a fourth embodiment of the present invention. In this embodiment, a bio-gel layer 4 is formed on a top surface of a foam material layer 2, and a plurality of bio-gel blocks 5 respectively set and filled in spaced through holes 21 of the foam material layer 2. Preferably, each of the bio-gel blocks 5 is integrally formed with the bio-gel layer 4 at top end and exposes to a bottom surface of the foam material layer 2 at bottom end.

A bottom material 6 is disposed on an undersurface of the foam material layer 2. A vibration absorbing material layer 7 is disposed on the top surface of the bio-gel blocks 5.

Further, a surface layer 3 may cover the top surface of the vibration absorbing material layer 7 and two side edges of the saddle 200.

Figure 10:
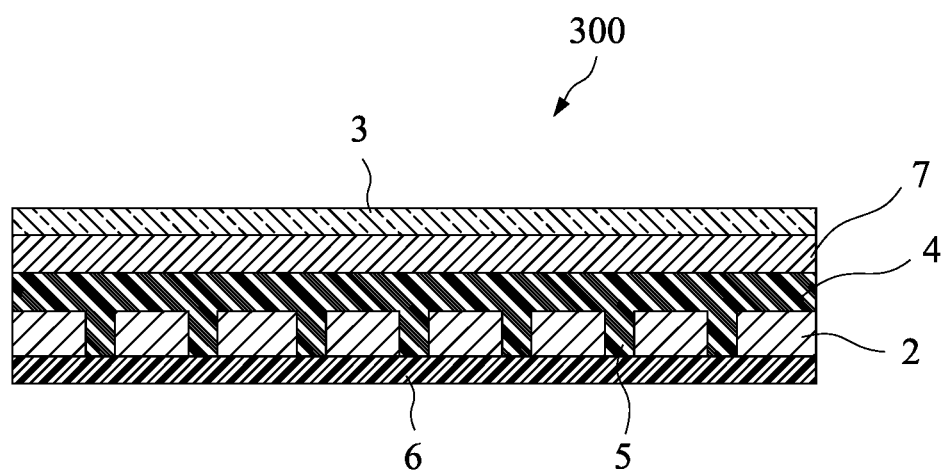
FIG. 10 is a cross-sectional view showing a cushion incorporating with a bio-gel structure according to a fifth embodiment of the present invention.

FIG. 10 is a cross-sectional view showing a cushion 300 incorporating with a bio-gel structure according to a fifth embodiment of the present invention. This embodiment is substantially identical to the fourth embodiment shown in FIG. 9, except that the surface layer 3 is designed to simply cover the top surface of the vibration absorbing material layer 7.

Figure 11:
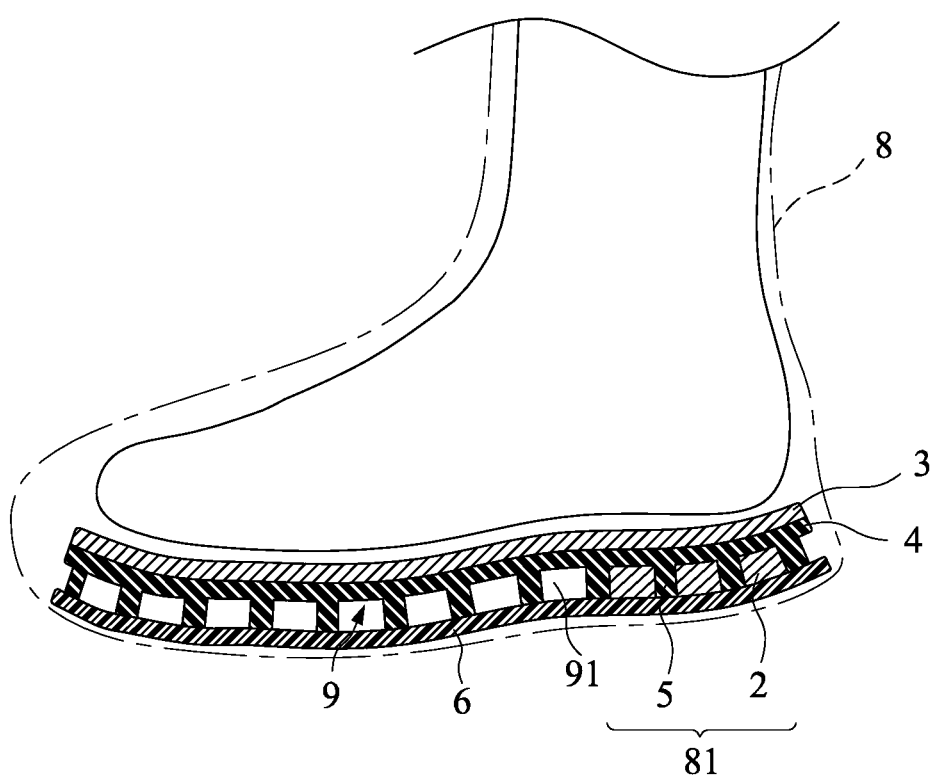
FIG. 11 is a schematic view illustrating the cushion is adapted to be put inside a shoe as an insole for the shoe.

With reference to FIG. 11, it shows that the bio-gel layer 4 is designed to have a contour adapted to be put inside a shoe 8 as an insole for the shoe 8. The bio-gel layer 4 fits the foot with dynamically self-adjusting for footwear. The bio-gel layer 4 is made by antimicrobial and breathable material.

The bottom material 6 is also designed to correspond to the contour of the bio-gel layer 4 and arranged in parallel with the bio-gel layer 4 with a distance between the bio-gel layer 4 and the bottom material 6. The bottom material 6 is preferably made of high support foam focusing on the support and shock-absorption of back heel of feet.

A plurality of spaced bio-gel blocks 5 are integrally formed with the bio-gel layer 4 and extended downward to the bottom material 6 to forming a plurality of air chambers 91 forming an air layer structure 9 between the bio-gel layer 4 and the bottom material 6. The air layer structure 9 can release the pressure of the bottom of foot and dispersion of it.

Each of the bio-gel blocks 5 has an independent cylinder gel structure capable of providing shack-absorption and reducing pressure for the shoe 8. Particularly, A foam material layer 2 is filled in selected air chambers 91 distributed over a selected partial area corresponding to a back heel area 81 of the shoe 8. The independent cylinder gel structure of the bio-gel blocks 5 combined with the high support foam material layer 2 and air layer structure 9 provides effects of shock-absorption and rebound support which can fit the foot with dynamically self-adjusting for footwear. It can release the pressure of the bottom of foot and dispersion of it. The massage effect enables users standing and walking for long periods of time without burden.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A cushion, comprising:
    a foam material layer having a top surface and a bottom surface formed with a plurality of spaced through holes disposed between the top surface and the bottom surface of the foam material layer;
    a bio-gel layer disposed on the top surface of the foam material layer;
    a plurality of bio-gel blocks respectively set and filled in selected through holes of the plurality of through holes of the foam material layer, the plurality of bio-gel blocks being distributed over a selected partial area of the foam material layer, each of the plurality of bio-gel blocks having a top end integrally formed with the bio-gel layer and a bottom end exposed to the bottom surface of the foam material layer; and
    a surface layer disposed on the bio-gel layer.

2. The cushion according to claim 1, further comprising a bottom material mounted to the bottom surface of the foam material layer.

3. The cushion according to claim 1, wherein a vibration absorbing material layer is arranged between the top surface of the bio-gel layer and the surface layer.

4. The cushion according to claim 3, wherein the vibration absorbing material layer is a memory foam layer made of polyurethane polymer.

5. The cushion according to claim 1, wherein the through holes are each structured as one of a cylindrical through hole and a truncated-conic through hole.

6. The cushion according to claim 1, wherein the plurality of bio-gel blocks are distributed over an entire area of the foam material layer.

7. The cushion according to claim 1, wherein the cushion has a contour adapted to be put inside a shoe as an insole.

8. The cushion according to claim 1, wherein the cushion is designed to fit for a bike saddle.

9. The cushion according to claim 1, wherein the cushion is mounted in a bike saddle.

10. A cushion, comprising:
    a bio-gel layer having a contour configured to be put inside a shoe as an insole for the shoe;
    a bottom material having a corresponding contour to the contour of the bio-gel layer and arranged in parallel with and being spaced from the bio-gel layer;
    a plurality of spaced bio-gel blocks integrally formed with the bio-gel layer and extending in a downward direction to the bottom material to form a plurality of air chambers, the air chambers forming an air layer structure between the bio-gel layer and the bottom material; and
    a foam material layer filled in selected air chambers distributed over a selected partial area corresponding to a back heel of a back foot area of the shoe.

11. The cushion according to claim 10, further comprising a surface layer disposed on the bio-gel layer.

12. The cushion according to claim 10, further comprising a vibration absorbing material layer disposed on the bio-gel layer.

13. The cushion according to claim 12, wherein the vibration absorbing material layer is a memory foam layer made of polyurethane polymer.

* * * * *